(12) United States Patent
Mahyar et al.

(10) Patent No.: US 11,308,332 B1
(45) Date of Patent: *Apr. 19, 2022

(54) INTELLIGENT CONTENT RATING DETERMINATION USING MULTI-TIERED MACHINE LEARNING

(71) Applicant: Amazon Technologies, Inc., Seattle, WA (US)

(72) Inventors: Hooman Mahyar, Los Angeles, CA (US); Muhammad Yahia, Anaheim, CA (US); Harshal Dilip Wanjari, Issaquah, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/856,744

(22) Filed: Apr. 23, 2020

Related U.S. Application Data

(63) Continuation of application No. 15/948,567, filed on Apr. 9, 2018, now Pat. No. 10,671,854.

(51) Int. Cl.
| | | |
|---|---|---|
| *G06K 9/00* | (2006.01) | |
| *G06N 20/00* | (2019.01) | |
| *H04N 21/234* | (2011.01) | |
| *G06K 9/62* | (2022.01) | |

(52) U.S. Cl.
CPC ..... *G06K 9/00751* (2013.01); *G06K 9/00718* (2013.01); *G06K 9/6254* (2013.01); *G06N 20/00* (2019.01); *H04N 21/23418* (2013.01)

(58) Field of Classification Search
CPC .......... G06K 9/00751; G06K 9/00718; G06K 9/6254; G06N 20/00; H04N 21/23418
USPC ....................................................... 382/159
See application file for complete search history.

(56) References Cited

U.S. PATENT DOCUMENTS

| | | | | |
|---|---|---|---|---|
| 2002/0059221 | A1* | 5/2002 | Whitehead | G06F 16/9535 |
| 2008/0262925 | A1* | 10/2008 | Kim | G06N 20/00 |
| | | | | 705/14.27 |
| 2015/0310647 | A1* | 10/2015 | Matange | G06Q 10/00 |
| | | | | 345/440 |
| 2018/0210728 | A1* | 7/2018 | Bhamidipaty | G06Q 10/063 |
| 2018/0276565 | A1* | 9/2018 | Brandao | G06N 20/00 |

* cited by examiner

*Primary Examiner* — Amandeep Saini
(74) *Attorney, Agent, or Firm* — Eversheds Sutherland (US) LLP

(57) ABSTRACT

Systems, methods, and computer-readable media are disclosed for systems and methods for intelligent content rating determination. Example methods include determining presence of a first feature in a first frame of a video using an object recognition algorithm, determining presence of a second feature in an audio file associated with the video using an audio processing algorithm, and determining presence of a third feature in a text file associated with the video using a natural language processing algorithm. Certain embodiments may include generating a predicted content rating for the video using a machine learning model, where the predicted content rating is based at least in part on the first feature, the second feature, and the third feature, and using feedback data for the predicted content rating to retrain the machine learning model.

18 Claims, 10 Drawing Sheets

INTELLIGENT CONTENT RATING DETERMINATION USING MULTI-TIERED MACHINE LEARNING

CROSS-REFERENCE TO RELATED APPLICATION

This application is a continuation of U.S. application Ser. No. 15/948,567, filed Apr. 9, 2018, the entire disclosure of which is hereby incorporated by reference.

BACKGROUND

Digital content, such as video content, audio content, and the like, may be subject to various content ratings. For example, a movie may have a content rating of "PG" (parental guidance), "R" (restricted), or another content rating, or audio content may have a content rating of "Explicit Content," and so forth. Content ratings may be used as guidance for consumers of the content, or for other purposes, such as restricting consumption of content to particular audiences. Content ratings may be different based on a rating entity or organization. For example, different countries may have different content rating guidelines, different organizations may have different ratings guidelines or categories, and the like. Content ratings by specific entities may therefore have an impact on the potential audiences that can consume content, and content creators may desire to understand content ratings for content they create. Accordingly, intelligent content rating determination using multi-tiered machine learning may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
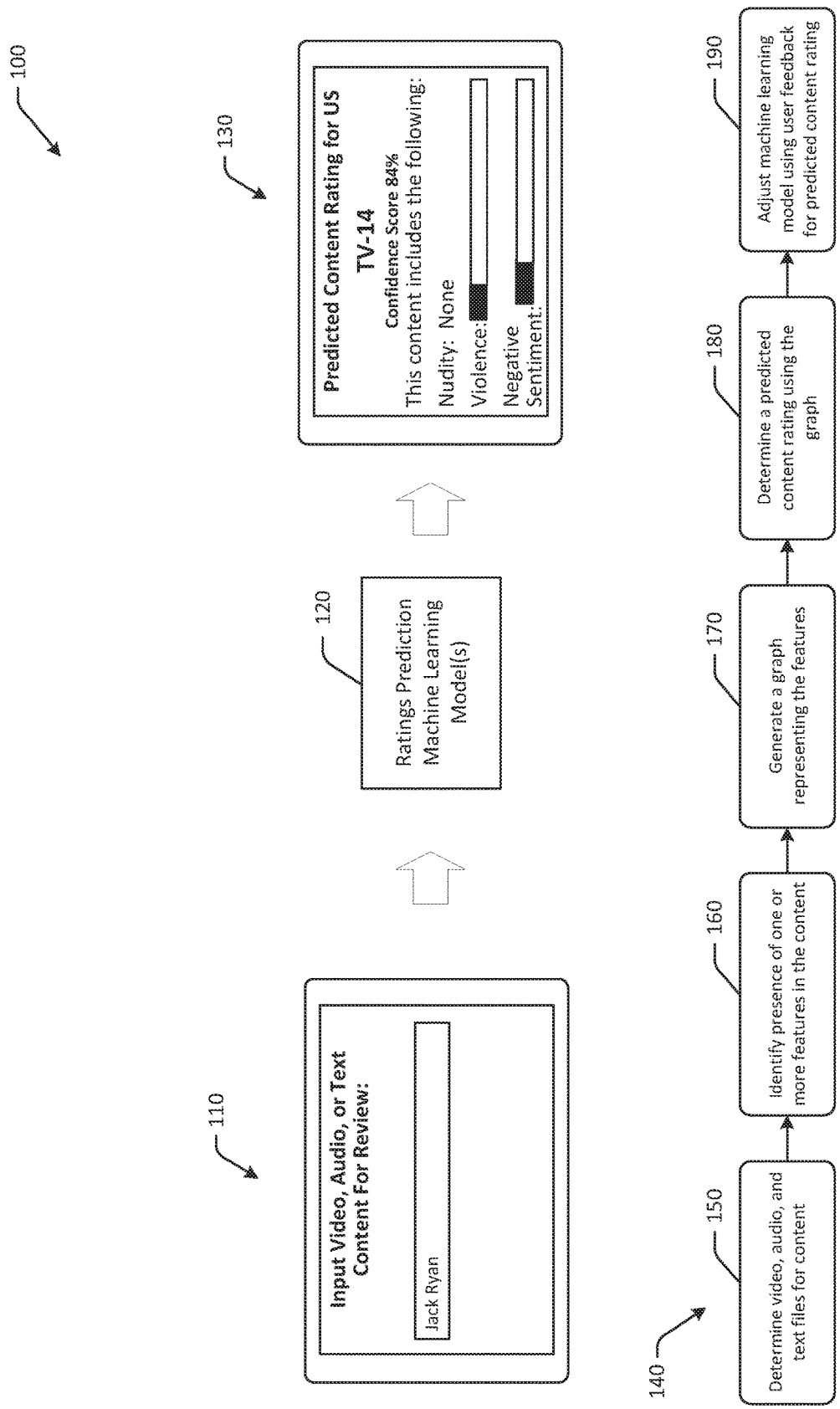
FIG. 1 is a schematic illustration of an example use case for intelligent content rating determination using multi-tiered machine learning in accordance with one or more example embodiments of the disclosure.

Content ratings for digital content may include categories and/or classifications that represent the content of, for example, a video, a song, or other digital content. For example, a movie may have a content rating assigned by Amazon Maturity Ratings, the Motion Picture Association of America (MPAA), or another rating entity, that may indicate to a consumer the suitability of content in the movie for certain audiences. For example, Amazon Maturity Ratings may include categories or classifications of "Kids" for all audiences, "Older Kids" for children 7 years of age or older, "Teens" for consumers 13 years of age or older, "Young Adults" for consumers 16 years of age or older, and "Adults" for consumers 18 years of age or older. In another example, MPAA ratings may include ratings such as "G" for general audiences, "PG" for parental guidance suggested, "PG-13" for parents strongly cautioned (e.g., some material may be inappropriate for children under 13, etc.), "R" for restricted (e.g., under 17 requires accompanying parent or guardian, etc.), "NC-17" for adults only, and the like. In another example, television content ratings for television programs may include ratings such as "TV-Y" for appropriate for all children, "TV-Y7" for children age 7 and above, "TV-G" for suitable for all ages, "TV-PG" for some material may be unsuitable for children, "TV-14" for some material unsuitable for children under 14, "TV-MA" for programming designed to be viewed by adults or children older than 17, etc. In another example, audio content, such as music, may have content ratings such as "Parental Advisory," "Edited," and so forth to reflect the content of the audio.

Content ratings may reflect the content or material for which the rating is assigned. For example, action movies that include nudity or violence may be assigned a rating of R by the MPAA, whereas a children's animation film may be assigned a rating of PG. Likewise, television programs with certain types of scenes, language, or themes may be assigned a rating by an entity based on the content presented in the television program. Factors such as nudity, sentiment, themes, language, violence, and/or other factors may be considered in determining content ratings.

Content ratings for the same content may vary based at least in part on the entity that is providing the content rating. For example, the MPAA may assign a content rating of PG to a certain movie, while another organization, such as a local school or parents group, may assign the same movie a different rating. In addition, different countries or jurisdictions may assign the same content different ratings because different countries or jurisdictions may follow different guidelines in determining appropriate ratings. For example, violence may be more readily accepted in American content rating guidelines than in certain European country guidelines, whereas the opposite may be true with respect to nudity (e.g., European countries may be more accepting of nudity than America, etc.). Accordingly, content ratings may vary across different ratings entities, such as organizations, countries, and the like.

Embodiments of the disclosure include systems and methods for intelligent content rating determination using multi-tiered machine learning. Certain embodiments may automatically determine content ratings for digital content, such as video content (e.g., movies, television programs, streaming content, etc.), audio content (e.g., music, etc.), and the like. Some embodiments may analyze content to determine a predicted content rating by a specific entity, such as by a specific organization or jurisdiction. For example, certain embodiments may perform a frame-by-frame analysis of video content, along with natural language processing of audio content that corresponds to the video content, to determine a likely content rating or classification that may be assigned to the content. In some embodiments, certain categories of themes or elements may be flagged, so as to provide guidance as to why a certain content rating may be assigned. For example, a predicted content rating of R may be associated with a category of "brief nudity" or "sexual themes," and so forth. As a result, users may determine a predicted content rating for content by different ratings entities, and may also determine reasons or specific portions of content that impact the predicted rating. In some instances, content ratings may be assigned to content using embodiments of the disclosure for content that may not be required to have a rating. For example, some streaming content, such as programming that is available only via internet streaming (e.g., YouTube videos, etc.), may not be subject to content ratings requirements, but can nonetheless be provided with a content rating using one or more embodiments of the disclosure.

This disclosure relates to, among other things, devices, systems, methods, computer-readable media, techniques, and methodologies for intelligent content rating determination using multi-tiered machine learning. Certain embodiments automatically determine content ratings for digital content using, for example, analysis of audio, video, and text (e.g., closed captioning, synopses, metadata, etc.) components of digital content, such as a movie, video, song, or other digital content. Certain embodiments determine predicted content ratings using machine learning and other methodologies. In some instances, machine learning (e.g., deep neural networks, etc.) may be used to identify various elements of content that impact an overall content rating, and output may be used to determine a dynamic rating determination system. Certain embodiments may include multi-tiered machine learning algorithms, in which a first machine learning algorithm determines features that are related to ratings from various assets (e.g., instances of nudity, language, drug use, etc.), and a second machine learning algorithm to determine which of those features are relevant to overall content ratings. A feedback loop may be used to continually improve accuracy of the machine learning model(s), which may include feedback from customers, operators, or other users.

Referring to FIG. 1, an example use case 100 for intelligent content rating determination using multi-tiered machine learning is depicted in accordance with one or more example embodiments of the disclosure. For example, at a first user interface 110 presented at a user device in FIG. 1, a user may input digital content for which a content rating is desired or to be determined. For example, a user may input a link to the content, upload the content, input a content identifier (e.g., a title, character name, actor name, etc.), or otherwise identify content for which a content rating is to be determined. The digital content may include video content, audio content, text content, and/or a combination thereof. In the example of FIG. 1, the user may upload a television program titled "Jack Ryan," which may include a video component, an audio component, and a text component (e.g., a subtitles file, metadata, synopses of the content, etc.)

One or more ratings prediction machine learning models 120 may be stored at a remote server and may be executed to determine a content rating or a predicted content rating for the identified content. For example, the ratings prediction machine learning model(s) 120 may be executed by a computing system to analyze the digital content and to output one or more content ratings and/or additional information for the digital content.

For example, as illustrated in FIG. 1, at a second user interface 130, predicted content rating information may be presented. The predicted content rating information may include a predicted content rating for a particular entity, as well as a graphical indication of a relative amount of certain types of content. The predicted content rating information may be an output of the ratings prediction machine learning model(s) 120. In FIG. 1, the predicted content rating for the "Jack Ryan" content may be TV-14 for an American television audience, and may not include any nudity, but may have some violent scenes and negative sentiment, as determined by the ratings prediction machine learning model(s) 120. As illustrated in the example of FIG. 1, the second user interface 130 may include the predicted content rating, as well as graphical indicators or representations of the certain scenes or categories of content that appear in the content for which the rating is determined. Other embodiments may have additional, fewer, or different types of outputs and/or information presented.

To determine predicted content ratings for content, an example process flow 140 is presented and may be performed, for example, by one or more remote servers. The remote server and/or computer system may include at least one memory that stores computer-executable instructions and at least one processor configured to access the at least one memory and execute the computer-executable instructions to perform various actions or operations, such as one or more of the operations in the process flow 140 of FIG. 1.

At a first block 150, video, audio, and text files for content may be determined. For example, a content identifier may be input or received at one or more remote servers. In other embodiments, content may be sent to the remote servers for analysis. A ratings entity may be identified, so as to determine which entity guidelines will be used to determine the predicted content rating. For example, a user may input a link to Jack Ryan content and select an American television ratings entity in the illustrated example.

At block 160, presence of one or more features may be identified in the content. For example, certain embodiments may use one or more detection modules or algorithms (e.g., object recognition modules, pattern recognition algorithms, etc.) to identify or detect the presence of one or more features in the content. Features may include, for example, the presence of firearms or drugs in a video file or video component of the content, screaming or explosions in an audio file or audio component of the content, negative language in a text file or text component of the content, and so forth. One or more detection modules may be used to process and/or detect various features in the content.

For example, a nudity detection module may be used to analyze the video of the content in a frame-by-frame analysis to detect the presence of female and/or male nudity in the content. If nudity is detected, the content may be determined to have a nudity feature. The length of time of nudity, the number of instances of nudity, and other data may be determined in some embodiments.

In another example, a violence detection module may be used to analyze the video and/or audio of the content in a frame-by-frame or segment-by-segment analysis to detect the presence of violence, as determined via the presence of certain objects (e.g., firearms, military personnel, weapons, etc.), explosions, blood, and other instances of violence. If violence is detected, the content may be determined to have a violence feature, and the length of time or amount of violence, as well as a level of graphicness, may be determined in some embodiments.

Certain embodiments may include a facial recognition module that may be used to analyze video and/or audio of the content in a frame-by-frame or segment-by-segment analysis to detect the presence of negative facial sentiment. For example, sentiments such as anger, fear, disgust, and the like may be determined to be negative, and may be determined to be present using one or more facial recognition modules.

An audio processing module may be used to determine the presence of screaming, explosions, and other instances of audio events that may impact the content rating. For example, the audio processing module may parse or segment audio associated with the content and identify events or instances of certain indicators or occurrences that may impact the content rating.

In another example, a semantic role labeling module may be used to analyze, such as parse and process, subtitles, topics, synopses, and/or other text data associated with the content to determine the presence of text features, such as certain language or themes that appear in the content.

Additional modules, such as object recognition modules for certain predefined objects, such as drugs, needles, etc. may be included in some embodiments. In some instances, a module may perform more than one form of analysis. For example, the ratings predictions machine learning model(s) 120 may include one or more modules, or may perform the operations of one or more module to determine the predicted content rating.

In some embodiments, a feature may be determined to be present if there is a threshold amount or length of time of the feature. For example, if there is less than a threshold length of five seconds of nudity in the content, the content may not be determined to have a nudity feature, or if there is only one explosion in the content, there may not be determined to have a violence feature. In other embodiments, each instance of a feature may be determined to be present, without any threshold.

At block 170, a graph representing the features is generated. For example, for one or more, or each, of the features identified or determined to be present in the content, a graph may be generated. The graph may represent the features determined to be present in the content, as well as an extent or amount of the respective features in some instances. In some instances, the generated graph may represent the features extracted from, or determined to be present in, the content. In one example, the graph may be a knowledge graph with nodes representing categories of features that are detected in the content. The graph may be converted into a table in some embodiments. For example, the graph may be flattened into a two-dimensional array or feature table representing the features that are present in the content.

The graph may include nodes representing the features. Certain features may be common amongst different pieces of content, and in some instances, features may be related between multiple pieces of content. For example, semantic role labeling may be used to detect locations referenced in a movie, and face detection may be used to identify actors that are common amongst different movies. The graph may represent these commonalities and may be used to train a neural network using features of the graph. The machine learning model may classify new content based on the features found in other graphs.

At block 180, a predicted content rating may be determined using the graph. For example, data from the graph may be used to determine the predicted content rating. In some instances, the ratings entity and/or specific guidelines may be used to determine the predicted content rating. In some embodiments, the feature table (derived from the graph) may be used to determine the predicted content rating instead of, or in addition to, the graph or related data. The feature table and/or graph may be an input to the ratings prediction machine learning model(s) 120.

A confidence score or confidence output representing a likelihood of accuracy may be determined in addition to the predicted content rating. The confidence score may be determined for the specific ratings entity. For example, the predicted content rating for a television program using American guidelines may have a confidence score that is different than the predicted content rating using European guidelines.

At block 190, the machine learning model may be adjusted using user feedback for the predicted content rating. For example, based at least in part on the confidence score for a predicted content rating, the predicted content rating may be sent to a user for manual review or may be automatically published. In some embodiments, a threshold confidence score (e.g., greater than 80%, 85%, 90%, etc.) may be used to determine whether manual review is needed or whether the rating should be published. User feedback, for example from manual review or after publishing, may be used as a feedback loop to improve accuracy of the ratings prediction machine learning model(s) 120.

Embodiments of the disclosure may include intelligent content rating determination using multi-tiered machine learning, and may include one or more modules that can be used to analyze digital content. Some embodiments may output predicted content ratings for various ratings organizations, along with confidence scores, and indicators of features of the content itself.

Example embodiments of the disclosure provide a number of technical features or technical effects. For example, in accordance with example embodiments of the disclosure, certain embodiments of the disclosure may automatically analyze audio, video, and/or text components of content. Certain embodiments may recognize or identify presence of certain objects and/or presence of certain themes or types of content using one or more machine learning modules or algorithms. As a result of improved functionality, content ratings may be accurately predicted without manual review, and content ratings predictions may increase in accuracy over time for multiple different content ratings organizations or entities. Embodiments of the disclosure may improve computing efficiency and bandwidth by extracting feature data from content and generating graphs and/or feature tables representing features of the content. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
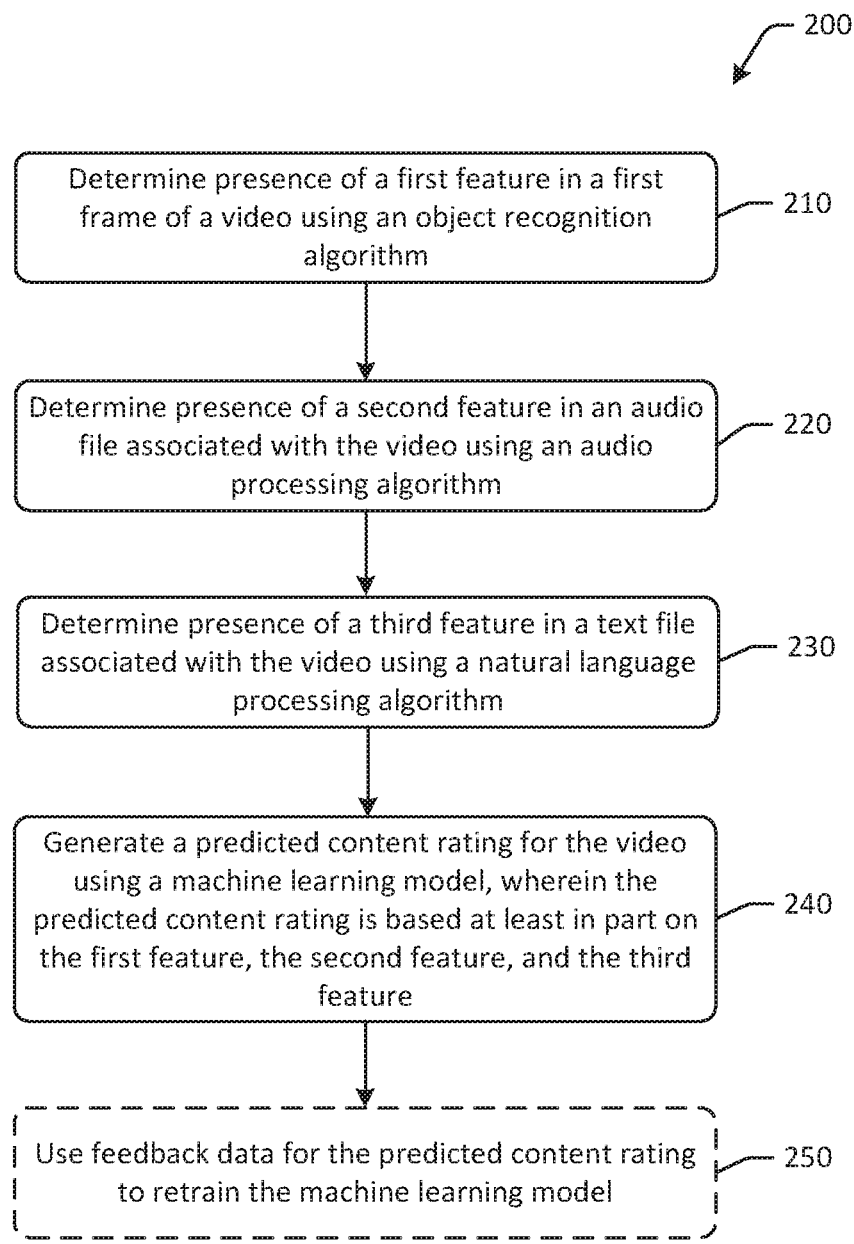
FIG. 2 is a schematic illustration of an example process flow for intelligent content rating determination using multi-tiered machine learning in accordance with one or more example embodiments of the disclosure.

FIG. 2 depicts an example process flow 200 for intelligent content rating determination using multi-tiered machine learning in accordance with one or more example embodiments of the disclosure. While example embodiments of the disclosure may be described in the context of movies or other video content, it should be appreciated that the disclosure is more broadly applicable to any type of digital content. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a user device, may be executed to determine presence of a first feature in a first frame of a video using an object recognition algorithm. For example, a remote server may determine the presence of one or more features in a first frame of video content. In some embodiments, the remote server may analyze individual frames of video content to determine whether certain features are present in the respective frames. Analysis of frames may include processing images using one or more object recognition algorithms, determining pixel color values, comparing certain portions of frames to previous or subsequent frames in the video, and the like. In one example, a drug needle object recognition algorithm may be used to determine that there is a drug needle present in a first frame of a video. In another example, a firearm detection module or algorithm may be used to determine that gun violence or a firearm is present in a first frame of a video. One or more object recognition algorithms may be used on individual frames or sets of frames in a video. The determined objects or features may be outputs of the respective modules or algorithms.

At block 220 of the process flow 200, computer-executable instructions stored on a memory of a device may be executed to determine presence of a second feature in an audio file associated with the video using an audio processing algorithm. For example, a remote server may analyze an audio file corresponding to a video. The audio file may include audible sounds, such as dialog, sound effects, soundtrack music, and the like corresponding to the video component of the video. The audio file may be analyzed to determine the presence of one or more features. For example, features extracted from, or determined using, audio files may include gunshots, screaming, certain words or language, tone, sentiment, and the like. Analysis of audio content or audio files may include speech-to-text conversions or transcriptions, parsing, and/or natural language processing. In some embodiments, audio content may be segmented into one or more discrete portions for classification and/or analysis. For example, segments may be classified as music, dialog, sound effects, and so forth. Differently classified portions may be analyzed using different signal processing and/or speech-to-text profiles. In some embodiments, natural language processing may be used to determine a meaning of certain portions of audio. In one example, an audio processing algorithm may be used to determine presence of an explosion feature in the audio file. In another example, the same or a different audio processing algorithm may be used to determine presence of screams in the audio file. In another example, presence of audio indicative of a gunshot in the audio file may be determined using a violence audio recognition model.

At block 230 of the process flow 200, computer-executable instructions stored on a memory of a device may be executed to determine presence of a third feature in a text file associated with the video using a natural language processing algorithm. For example, a remote server may determine text content or a text file associated with the video. The text file may be a subtitles file, metadata including a synopsis of the video or portions of the video, actor data, and the like. In some instances, the text file may be generated based at least in part on the audio file of the video (e.g., a speech-to-text conversion of portions of the audio file of the video, etc.). Natural language processing and/or character detection modules or algorithms may be used to determine features such as sentiment of the text, certain predetermined words or phrases (e.g., inappropriate words, cursing, etc.), and other text-based features. For example, a subtitle text file associated with the video may be processed or analyzed using one or more natural language processing algorithms, and a remote server may determine the presence of a predetermined inappropriate phrase in the text file.

At block 240, computer-executable instructions stored on a memory of a device may be executed to generate a predicted content rating for the video using a machine learning model, where the predicted content rating is based at least in part on the first feature, the second feature, and the third feature. For example, the remote server may generate a predicted content rating for the video using one or more machine learning models or algorithms, where inputs to the model(s) or algorithm(s) include the presence of the detected first feature, second feature, and third feature. In some embodiments, a number of instances of certain features (e.g., a number of times curse words appear in a text file or audio file, etc.), or a length of presentation time of certain features (e.g., a length of nude scenes or violent scenes, etc.) may be used to determine the predicted content rating. The predicted content rating may be for a specific ratings entity. For example, a predicted content rating may be determined specific for MPAA, where the predicted content rating is determined using MPAA guidelines, or where the predicted content rating is determined using a machine learning model trained using MPAA rated content. More than one predicted content rating may be determined in some embodiments. An indicator of confidence in accuracy of the predicted content rating, such as a confidence score or confidence interval, may be determined using the machine learning model in some embodiments.

At optional block 250, computer-executable instructions stored on a memory of a device may be executed to use feedback data for the predicted content rating to retrain the machine learning model. For example, the remote server may output the predicted content rating to one or more users, and feedback indicative of the accuracy of the predicted content rating may be used to improve accuracy of future predictions generated by the machine learning model. For example, a manual operator may review one or more of the predicted content ratings and may determine whether the predicted content rating is accurate or should be adjusted. Based at least in part on signals from user feedback (e.g., modifications to or approval of predicted content ratings, etc.), the machine learning model may be continuously trained or updated, so as to improve accuracy for subsequent predictions. In some embodiments, confidence scores may be used to determine whether to flag or generate review notifications for certain predicted content ratings. For example, a publishing threshold of 90% may be implemented, where predicted content ratings having confidence scores of less than 90% may be flagged for manual review, and feedback following the manual review may be used to retrain the machine learning model. For example, a flag notification may be generated for manual review of the predicted content rating, and a manual review indication that the predicted content rating is accurate or inaccurate may be received or determined. Manual review indications or other user feedback may be used to retrain the ratings machine learning model.

Predicted content ratings having a confidence score of 90% or greater (in one example) may be published for general user access or review without manual review (although feedback from general users may still be collected and used for updating the machine learning model). Different confidence scores or publishing thresholds may be used for different predicted content ratings. In one example, a predicted content rating of R for a movie may have a relatively higher publishing threshold than a predicted content rating of PG. As a result, a total number of predicted content ratings flagged for manual review may be reduced.

Figure 3:
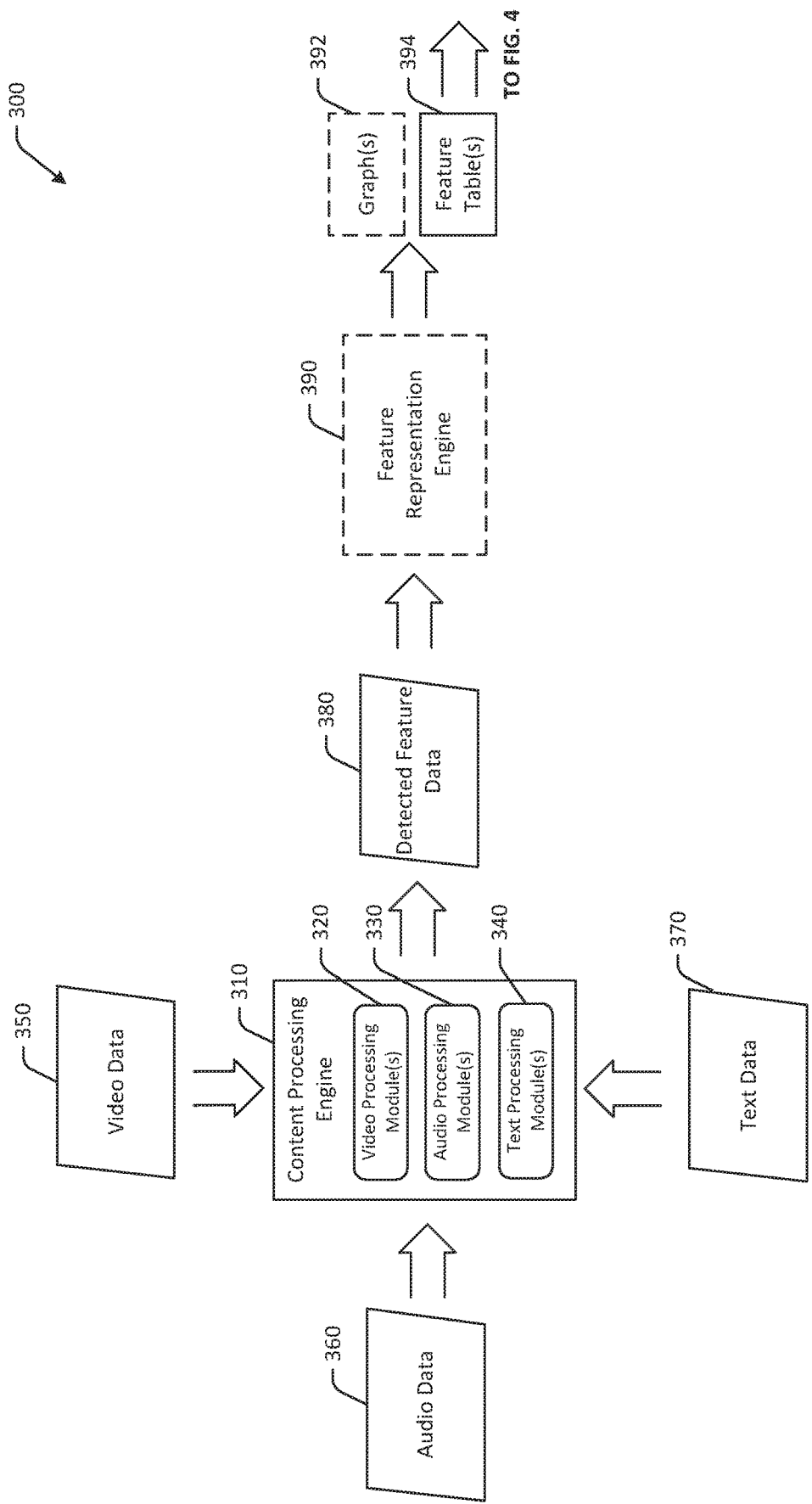
FIGS. 3-4 schematically illustrate an example data flow and machine learning model output for determining content ratings predictions in accordance with one or more example embodiments of the disclosure.
Figure 4:
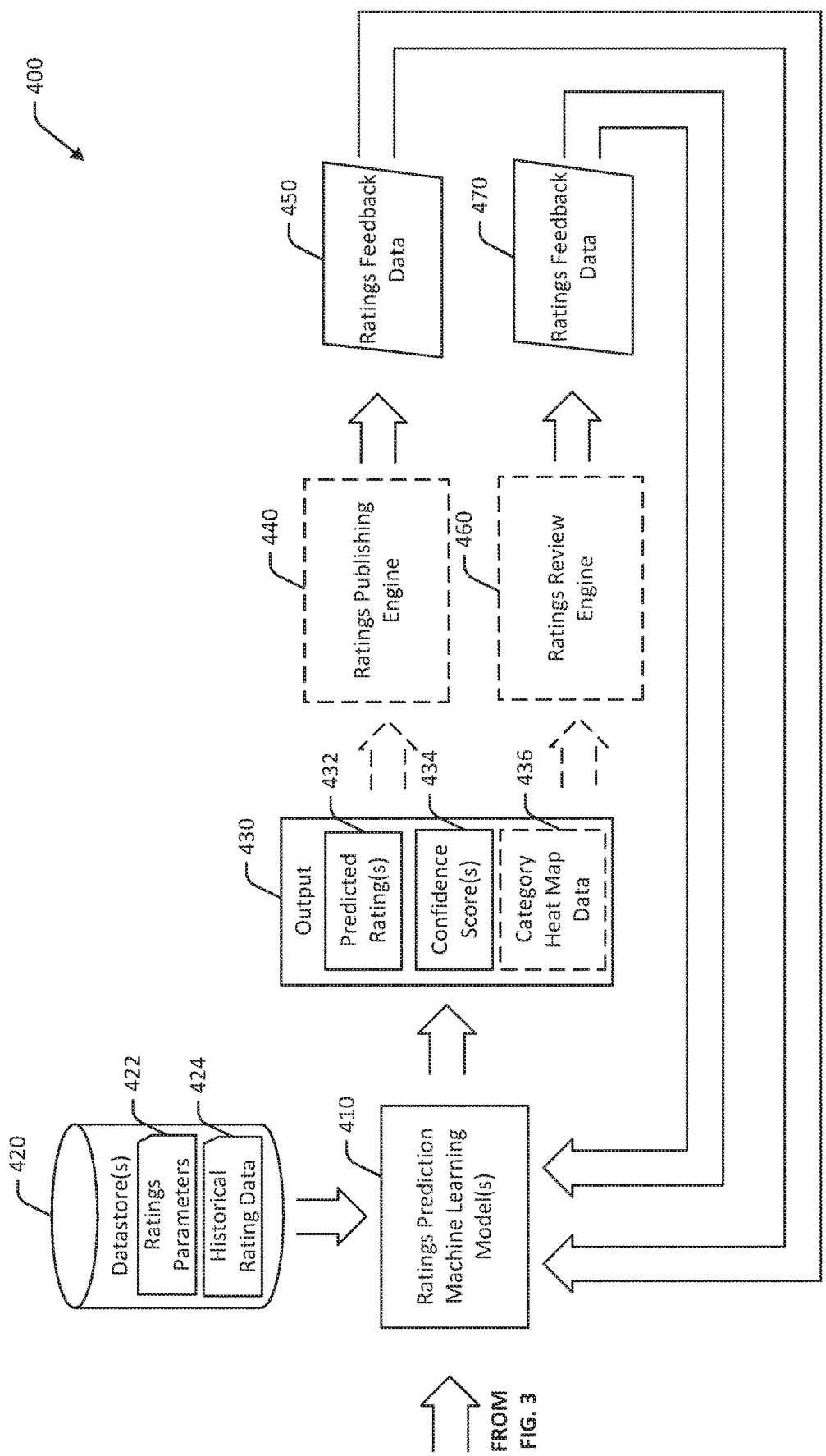

FIGS. 3-4 schematically illustrate an example data flow and machine learning model inputs and outputs for determining content ratings predictions in accordance with one or more example embodiments of the disclosure. Different embodiments may include different, additional, or fewer inputs or outputs than those illustrated in the examples of FIGS. 3-4.

In FIG. 3, an example data flow 300 is schematically depicted. A content processing engine 310 may be configured to detect or determine one or more features present in digital content, such as audio, video, and/or text content. The content processing engine 310 may be stored at and/or executed by one or more remote servers. The content processing engine 310 may include one or more modules or algorithms, and may be configured to identify or determine the presence of one or more features in digital content.

For example, the content processing engine 310 may include one or more video processing modules 320, one or more audio processing modules 330, and/or one or more text processing modules 340. Additional or fewer, or different, modules may be included. The video processing module(s) 320 may be configured to process and/or analyze video content. For example, the video processing module(s) 320 may be configured to determine frames or sets of frames of video content and may be configured to detect certain features, such as certain objects or certain types of scenes, which may include nudity, violence, and the like. For example, a video file for a movie may include a first frame, a second frame, and so forth. The video processing module(s) 320 may be configured to detect or analyze sentiment in video content. For example, the video processing module(s) 320 may include facial recognition and/or sentiment detection algorithms that can be used to identify sentiment or themes over frames or segments of the video content. Video processing module(s) 320 may include one or more object recognition algorithms configured to detect at least one of nudity, predefined objects, predefined scenery (e.g., certain locations, etc.), and the like.

The audio processing module(s) 330 may be configured to process and/or analyze audio content, such as audible dialog, sound effects, music, and other audio. In some instances, the audio processing module(s) 330 may be configured to convert audio to text and/or perform natural language processing to determine a meaning of certain portions of audio or its corresponding transcription. The audio processing module(s) 330 may be configured to detect features such as violence (e.g., gunshots, explosions, etc.), sex (e.g., moaning, etc.), explicit language (e.g., presence of certain words or phrases, etc.), sentiment, tone, and/or other features. Audio processing module(s) 330 may include one or more algorithms configured to detect at least one of predefined expressions, predefined sounds, and the like.

The text processing module(s) 340 may be configured to analyze and/or process text content, such as text received from an audio-to-text transcription provided by the audio processing module(s) 330, subtitles associated with content, content summaries or synopses, chapter or section titles or descriptions, and/or other data or metadata associated with content. The text processing module(s) 340 may include one or more natural language processing modules or algorithms and may be configured to detect or determine the presence of features such as certain words or phrases, themes, sentiment, topics, and/or other features. The text processing module(s) 340 may be configured to perform semantic role labeling, semantic parsing, or other processes configured to assign labels to words or phrases in a sentence that indicate the respective word or phrase's semantic role in a sentence, such as object, result, subject, goal, etc. Semantic role labeling may be a machine learning or artificial intelligence based process. Text processing module(s) 340 may include one or more algorithms configured to detect a meaning of text-based sentences.

The content processing engine 310 may receive one or more inputs for content for which a predicted content rating is to be generated. For example, the content processing engine 310 may receive one or more of video data 350 associated with content for which a predicted content rating is to be generated, audio data 360 associated with content for which a predicted content rating is to be generated, and/or text data 370 associated with content for which a predicted content rating is to be generated. In some embodiments, the video data 350, audio data 360, and/or text data 370 may be extracted from a content file.

The content processing engine 310 may process the respective data associated with the content for which a predicted content rating is to be generated. For example, the video data 350 may be processed using one or more of the video processing module(s) 320, the audio processing module(s) 330, and/or the text processing module(s) 340. Likewise, the audio data 360 and/or the text data 370 may be processed using one or more of the modules or algorithms of the content processing engine 310.

Using one or more algorithms or modules, the content processing engine 310 may determine the presence of one or more features in the content, and may output detected feature data 380. The detected feature data 380 may indicate the feature detected in the respective audio, video, and/or text data of the content. For example, the detected feature data 380 may include data related to a number of instances of nudity, a number of instances of curse words, a length of violent scenes, a type of violence, a type of drug use, types of themes, types of sentiment, and other features that may be detected in the audio, video, or text of the content.

The detected feature data 380 may be optionally input at a feature representation engine 390. The feature representation engine 390 may be configured to convert the detected feature data 380 into various formats. For example, the feature representation engine 390 may optionally generate one or more graphs 392, such as a knowledge graph, that represents the detected feature data 380. In another example, the feature representation engine 390 may generate one or more feature tables 394 representing the detected feature data 380. In some embodiments, the feature representation engine 390 may be configured to receive graphs or graph data from the content processing engine 310, and may flatten the graph or use the graph or graph data to generate one or more feature tables 394. In some instances, the feature representation engine 390 may be configured to generate a graph 392, and subsequently use the graph to generate a feature table 394. In some embodiments, the content processing engine 310 may generate the graph(s) 392 and/or the feature table(s) 394 based at least in part on output of the one or more processing modules at the content processing engine 310. Graph(s) 392 or feature table(s) 394 may be formatted or configured for use by a machine learning model.

The one or more feature tables 394 output from the feature representation engine 390 and/or content processing engine 310 may be fed as an input to one or more ratings prediction machine learning models 410 illustrated in FIG. 4. In some embodiments, the graph(s) 392 may be fed as an input to the ratings prediction machine learning model(s) 410 instead of, or in addition to, the feature table(s) 394.

In FIG. 4, an example data flow 400 is schematically depicted. The output of the content processing engine 310 and/or the feature representation engine 390, such as the graph(s) 392 and/or the feature table(s) 394 may be input at the ratings prediction machine learning model(s) 410. In some embodiments, the feature table(s) 394 may be input at the ratings prediction machine learning model(s) 410. The ratings prediction machine learning model(s) 410 may be configured to generate a predicted content rating for the content based at least in part on the feature table(s) 394.

One or more datastores 420 may include data that may be input at, or otherwise accessed by, the ratings prediction machine learning model(s) 410 to determine a predicted content rating. For example, the datastore 420 may include ratings parameters 422 that may indicate which features may affect or impact content ratings for particular entities. For example, nudity may impact American content ratings more than nudity may impact European content ratings. Nonetheless, nudity may be a ratings parameter that affects content ratings and may be reflected in the ratings parameters data 422. In some embodiments, the ratings parameters data may include weighting respective to one or more ratings entities of certain features. For example, an impact of violence may vary across different ratings entities, and may therefore a violence feature may be weighted differently for different content rating predictions based on a ratings entity. The ratings parameters 422 may include the available ratings categories for particular entities, such as MPAA may include ratings categories of NC-17, R, PG-13, PG, and G, and so forth for other ratings entities.

The datastore 420 may include historical rating data 424, which may be indicative of previous content rating predictions by the ratings prediction machine learning model(s) 410, and subsequent user feedback, and may be used to improve accuracy of content rating predictions. In some embodiments, the historical rating data 424 may include actual ratings associated with content, which may be used for initial model training and/or feature extraction.

The ratings prediction machine learning model(s) 410 may be configured to output one or more values. For example, output 430 of the ratings prediction machine learning model(s) 410 may include one or more predicted content ratings 432 (e.g., content ratings for various entities, etc.), respective confidence scores 434 for predicted content ratings, optional category heat map data 436, and/or additional, fewer, or different outputs. The predicted content rating 432 may be a content rating that is most likely to be assigned to the content, based at least in part on features determined to be present in the audio, video, and/or text associated with the content. In some embodiments, the ratings prediction machine learning model(s) 410 may select a predicted content rating from a predetermined set of content rating selections. For example, if the ratings prediction machine learning model(s) 410 is determining a predicted content rating for American television, the ratings prediction machine learning model(s) 410 may select a content rating from predetermined options of TV-Y, TV-Y7, TV-G, TV-PG, TV-14, or TV-MA. For example, the ratings prediction machine learning model(s) 410 may select a first predicted content rating for a movie using a feature table or related data, where the first predicted content rating is a likely rating classification for the movie in a first country, such as America, and may select a second predicted content rating for the video from a second set of content ratings for a second entity, such as Germany, using the ratings prediction machine learning model(s) 410.

The confidence scores 434 may be determined based at least in part on a likelihood that the predicted content rating for a particular entity, such as a particular country, is accurate. The confidence score may be determined based at least in part on the particular features detected in the content, as well as the training data used to train the ratings prediction machine learning model(s) 410. The category heat map data 436 may represent a pervasiveness or amount of certain types of content or themes found in the content. For example, a graphical representation of the amount of nudity may be determined as part of the category heat map data 436. In some embodiments, the category heat map data 436 may include brief descriptions of the features detected in the content, such as "excessive adult language," "excessive violence," etc. Confidence scores may be determined based at least in part on presence of one or more of the detected features being present in a set of training data for the machine learning model.

In some embodiments, depending on the confidence score for a predicted content rating, the content rating either may be automatically published, or may be directed through a manual review process. For example, a confidence score threshold or a publishing threshold may be used to determine whether to send a predicted content rating 432 to a ratings publishing engine 440, which may push the predicted content rating to a publishing server for publishing and viewing by general users or consumers of the associated content, or to a ratings review engine 460, which may await confirmation by an operator prior to publishing. In other embodiments, all predicted ratings may be published or reviewed manually. The ratings publishing engine 440 and/or the ratings review engine 460 may be optional, and one or both may be included.

Confidence score thresholds may vary for different ratings entities, and may vary based at least in part on the predicted content rating. For example, a confidence score of 75% may be sufficient to publish a predicted content rating of G using Amazon Maturity Ratings or MPAA guidelines, while a confidence score of 75% may not be sufficient to publish a predicted content rating of R. Some embodiments may include rules, such as automatically routing predicted content ratings of NC-17 or other extreme ratings to the ratings review engine 460 for confirmation of accuracy. Confidence score thresholds may vary across ratings entities as well. For example, a confidence score of 85% for any MPAA rating may satisfy a confidence score threshold for MPAA ratings, whereas a confidence score threshold of 95% may be needed to satisfy a confidence score threshold for French ratings or Amazon Maturity Ratings.

Predicted content ratings routed to the ratings publishing engine 440 may be published for consumption by consumers. Consumers that disagree with the predicted content rating or that have feedback for the predicted content rating may provide feedback, which may be aggregated as ratings feedback data 450. For example, users may indicate whether or not they agree with the predicted content rating after consuming the content. Such indications may be fed back as feedback loops or inputs at the ratings prediction machine learning model(s) 410. The ratings feedback data 450 may be used to improve the accuracy of future ratings predictions and confidence scores output by the ratings prediction machine learning model(s) 410.

Similarly, predicted content ratings routed to the ratings review engine 460 may be manually reviewed, and feedback from a manual reviewer, such as an indication of whether the prediction was correct or incorrect, as well as an adjusted rating, may be aggregated as ratings feedback data 470 and fed back as feedback loops or inputs at the ratings prediction machine learning model(s) 410. The ratings feedback data 470 may be used to improve the accuracy of future ratings predictions and confidence scores output by the ratings prediction machine learning model(s) 410. In some embodiments, the ratings feedback data 460 and ratings feedback data 470 may be used to retraining the ratings prediction machine learning model(s) 410.

As a result, predicted content rating determinations output by the ratings prediction machine learning model(s) 410 may improve over time as additional user feedback data is received, and more data is captured to determine the relationships between the various features present in content and the related impact on content ratings by different entities. Accordingly, manual review or assignment of content ratings may be replaced or partially replaced by one or more ratings prediction machine learning model(s) 410.

Figure 5:
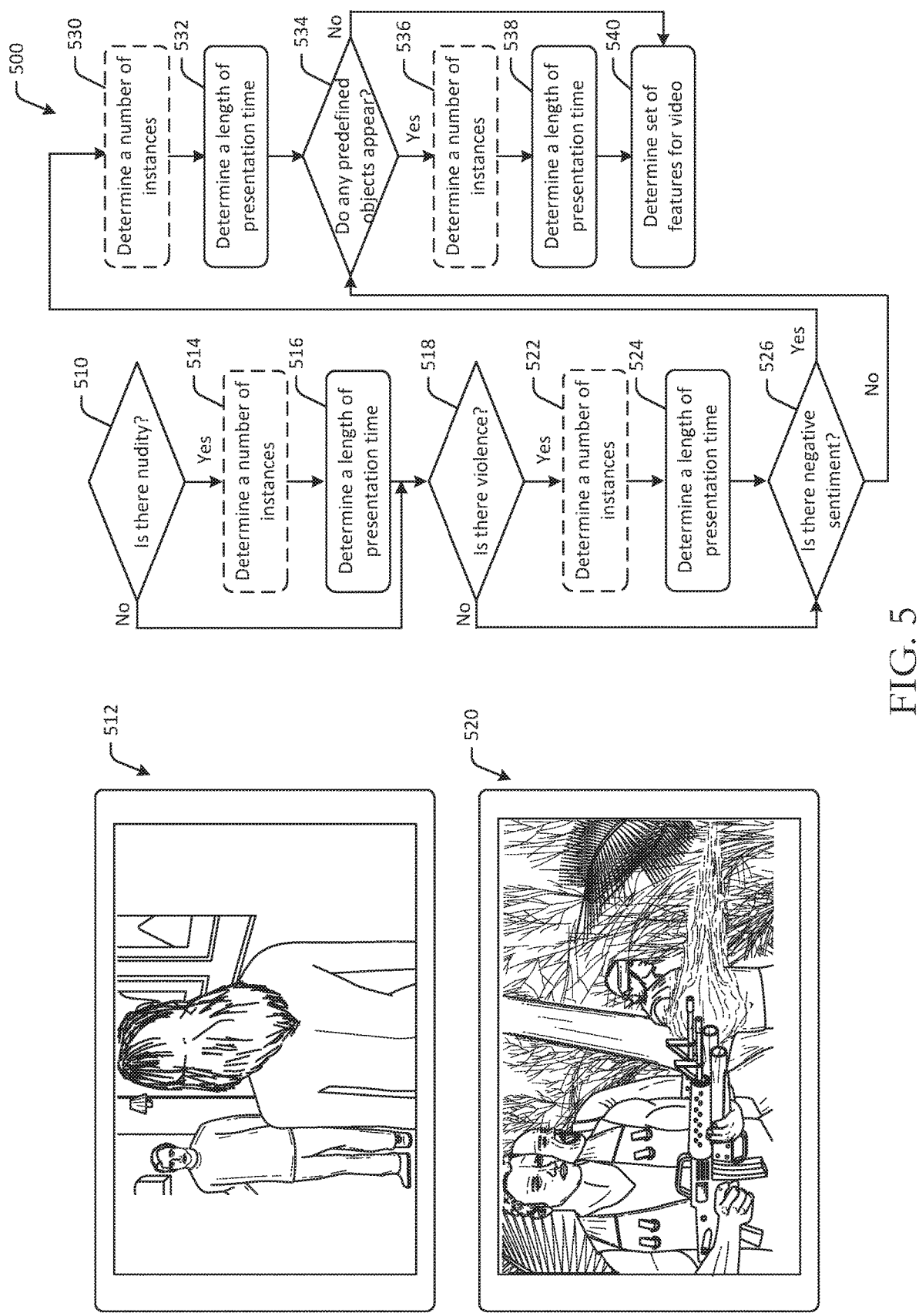
FIG. 5 is a schematic illustration of example user interfaces and an example process flow for determining a set of features in digital content in accordance with one or more example embodiments of the disclosure.

FIG. 5 is a hybrid schematic illustration of example user interfaces and an example process flow 500 for determining a set of features in digital content in accordance with one or more example embodiments of the disclosure. While example embodiments of the disclosure may be described in the context of frames or images, it should be appreciated that the disclosure is more broadly applicable to any suitable portion of digital content. Some or all of the blocks of the process flows in this disclosure may be optional and may be performed in a distributed manner across any number of devices. The operations of the process flow 500 may be performed in a different order. The process flow 500 may be executed to determine features related to nudity, sex, violence, drugs, and other features.

At determination block 510 of the process flow 500, computer-executable instructions stored on a memory of a device may be executed to determine whether nudity is present in the video content. For example, a remote server or a user device may be used to analyze one or more portions of video of a content file to determine whether instances of nudity are present. Nudity may be determined to be present based at least in part on object detection, pattern recognition (e.g., nudity image recognition, etc.), or other image or video processing algorithms. In some embodiments, individual frames or sets of frames may be analyzed to determine whether nudity is present. For example, at a first frame 512 of the video, partial nudity may be determined to be present as a result of detecting a nude woman's back. The back of the woman may be determined to be nude because of skin exposure, in one example. It may therefore be determined that at least partial nudity is present in the first frame 512, and, correspondingly, in the video content.

If it is determined that nudity is present at determination block 510, the process flow 500 may proceed to optional block 514, at which a number of instances of nudity may be determined. For example, computer-executable instructions stored on a memory of a device may be executed to determine a number of instances, or a number of discrete times of occurrence, of nudity throughout the content.

The process flow 500 may proceed to block 516, at which a length of presentation time may be determined. For example, computer-executable instructions stored on a memory of a device may be executed to determine a length of presentation time of nudity in the content. For example, a first scene with nudity may have a length of presentation time of 35 seconds, while a second scene with nudity may have a length of presentation time of 3 seconds, for a length of presentation time of nudity in the content totaling 38 seconds. The length of presentation time may be used to determine how much of an impact the nudity may have on the overall content rating prediction.

If it is determined at determination block 510 that there is no nudity present in the content, or after determining the length of presentation time of nudity at block 516, the process flow 500 may proceed to determination block 518. At determination block 518, computer-executable instructions stored on a memory of a device may be executed to determine whether violence is present in the video content. For example, a remote server or a user device may be used to analyze one or more portions of video of a content file to determine whether instances of violence are present. Violence may be determined to be present based at least in part on object detection (e.g., firearms, drugs, paraphernalia, etc.), pattern recognition, or other audio, image, or video processing algorithms. In some embodiments, individual frames or sets of frames may be analyzed to determine whether violence is present. For example, at a second frame 520 of the video, violence may be determined to be present as a result of detecting firearms and shooting action. It may therefore be determined that at least one violent feature is present in the second frame 520, and, correspondingly, in the video content. In some embodiments, audio files or text files may also be used to determine violence features, such as explosion sound effects and the like.

If it is determined that violence is present at determination block 518, the process flow 500 may proceed to optional block 522, at which a number of instances of violence may be determined. For example, computer-executable instructions stored on a memory of a device may be executed to determine a number of instances, or a number of discrete times of occurrence, of violence throughout the content.

The process flow 500 may proceed to block 524, at which a length of presentation time may be determined. For example, computer-executable instructions stored on a memory of a device may be executed to determine a length of presentation time of violence or violent scenes in the content. For example, a first scene with violence may have a length of presentation time of 50 seconds, while a second scene with violence may have a length of presentation time of 12 seconds, for a length of presentation time of violence in the content totaling 62 seconds. The length of presentation time may be used to determine how much of an impact the violence may have on the overall content rating prediction.

If it is determined at determination block 518 that there is no violence present in the content, or after determining the length of presentation time of violence at block 524, the process flow 500 may proceed to determination block 526. At determination block 526, computer-executable instructions stored on a memory of a device may be executed to determine whether negative sentiment is present in the video content. For example, a remote server or a user device may be used to analyze one or more portions of video of a content file to determine whether instances of negative sentiment are present. Negative sentiment may be determined to be present based at least in part on object detection, facial recognition (e.g., facial sentiment detection, etc.), or other audio, text, image, or video processing algorithms. In some embodiments, individual frames or sets of frames, or portions of text data or audio data, may be analyzed to determine whether negative sentiment is present. Negative sentiment may include certain tones of voice, certain facial expressions (e.g., fear, anger, etc.), certain themes or events, certain language or dialog, and the like. In the example of FIG. 5, negative sentiment may be determined to be present at least in the second frame 520, based at least in part on facial analysis of the actors depicted in the second frame 520 (e.g., negative facial sentiment, such as angry facial sentiment, scared facial sentiment, fearful facial sentiment, etc.) and, correspondingly, present in the video content.

If it is determined that negative sentiment is present at determination block 526, the process flow 500 may proceed to optional block 530, at which a number of instances of negative sentiment may be determined. For example, computer-executable instructions stored on a memory of a device may be executed to determine a number of instances, or a number of discrete times of occurrence, of negative sentiment throughout the content.

The process flow 500 may proceed to block 532, at which a length of presentation time may be determined. For example, computer-executable instructions stored on a memory of a device may be executed to determine a length of presentation time of negative sentiment in the content. For example, a first scene with negative sentiment may have a length of presentation time of 203 seconds, while a second scene with negative sentiment may have a length of presentation time of 313 seconds, for a length of presentation time of negative sentiment in the content totaling 515 seconds. The length of presentation time may be used to determine how much of an impact the negative sentiment may have on the overall content rating prediction.

If it is determined at determination block 526 that there is no negative sentiment present in the content, or after determining the length of presentation time of negative sentiment at block 532, the process flow 500 may proceed to determination block 534. At determination block 534, computer-executable instructions stored on a memory of a device may be executed to determine whether any predefined objects appear or are otherwise present in the video content. For example, a remote server or a user device may be used to analyze one or more portions of video of a content file to determine whether instances of any predefined objects are present. Predefined objects may be certain objects such as firearms, explosions, needles, drugs, and so forth. Objects may be determined to be present based at least in part on object detection, facial recognition (e.g., facial sentiment detection, etc.), or other audio, text, image, or video processing algorithms. In some embodiments, individual frames or sets of frames, or portions of text data or audio data, may be analyzed to determine whether any predefined objects are present. In the example of FIG. 5, predefined objects may be determined to be present at least in the second frame 520, based at least in part on object recognition of firearms depicted in the second frame 520, and, correspondingly, present in the video content.

If it is determined that any predefined objects are present at determination block 534, the process flow 500 may proceed to optional block 536, at which a number of instances of predefined objects may be determined. For example, computer-executable instructions stored on a memory of a device may be executed to determine a number of instances, or a number of discrete times of occurrence, of any predefined objects throughout the content.

The process flow 500 may proceed to block 538, at which a length of presentation time may be determined. For example, computer-executable instructions stored on a memory of a device may be executed to determine a length of presentation time of any predefined objects that appear in the content. For example, a first scene with a first predefined object may have a length of presentation time of 12 seconds, while a second scene with a second predefined object may have a length of presentation time of 13 seconds, for a length of presentation time of predefined objects in the content totaling 25 seconds. The length of presentation time may be used to determine how much of an impact the predefined objects may have on the overall content rating prediction.

If it is determined at determination block 534 that no predefined objects appear or are present in the content, or after determining the length of presentation time of predefined objects at block 538, the process flow 500 may proceed to block 540, at which a set of features for the video may be determined. For example, using some or each of the nudity, violence, negative sentiment, and/or predefined objects detected or determined to be present in the content, a set of features may be determined. The set of features may be captured in a graph format, table format, or other format.

Figure 6:
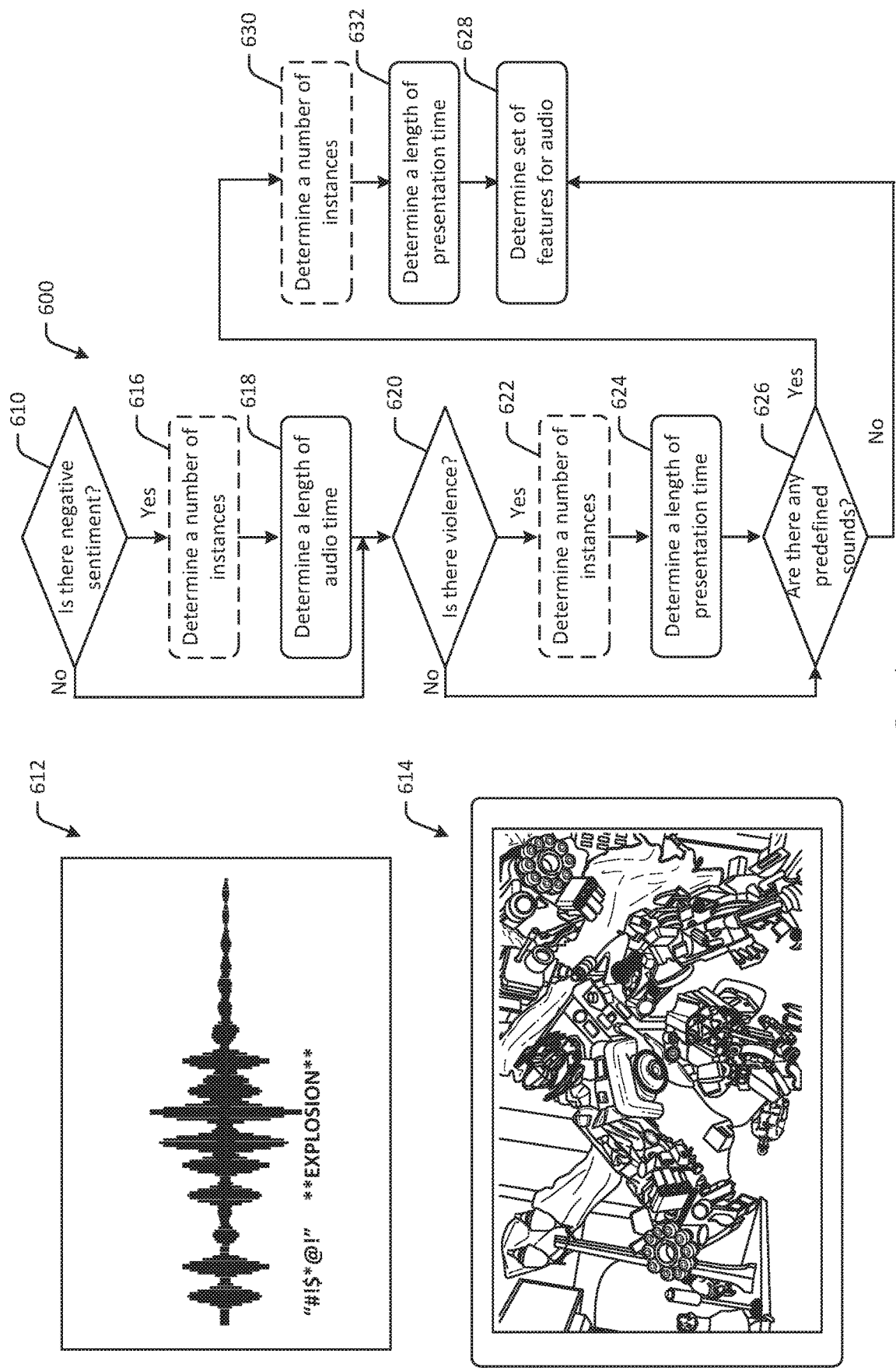
FIG. 6 is a schematic illustration of example user interfaces and an example process flow for determining a set of features in digital content in accordance with one or more example embodiments of the disclosure.

FIG. 6 is a hybrid schematic illustration of example user interfaces and an example process flow 600 for determining a set of features in digital content in accordance with one or more example embodiments of the disclosure. While example embodiments of the disclosure may be described in the context of frames or images and audio, it should be appreciated that the disclosure is more broadly applicable to any suitable portion of digital content. Some or all of the blocks of the process flows in this disclosure may be optional and may be performed in a distributed manner across any number of devices. The operations of the process flow 600 may be performed in a different order. The process flow 600 may be executed to determine features related to nudity, sex, violence, drugs, and other features.

At determination block 610 of the process flow 600, computer-executable instructions stored on a memory of a device may be executed to determine whether negative sentiment is present in audio content. For example, a remote server or a user device may be used to analyze one or more portions of audio of a content file to determine whether instances of negative sentiment are present. Negative sentiment may be determined to be present based at least in part on certain audio frequencies (e.g., those corresponding to screams, etc.), sound recognition (e.g., explosion detection, etc.), or other audio processing algorithms. In some embodiments, individual segments or sets of segments, of audio data, may be analyzed to determine whether negative sentiment is present. Negative sentiment may include certain tones of voice, certain words or phrases (e.g., inappropriate language, etc.), certain themes or events, certain sounds or audible events, and the like. In the example of FIG. 6, example audio signal 612 may correspond to a video frame 614 of the content where a character yells an expletive. The occurrence of the expletive may be determined to be negative sentiment. As a result, negative sentiment may be determined to be present at least in the portion of the video segment 612, based at least in part on audio analysis, and, correspondingly, present in the video content.

If it is determined that negative sentiment is present at determination block 610, the process flow 600 may proceed to optional block 616, at which a number of instances of negative sentiment may be determined. For example, computer-executable instructions stored on a memory of a device may be executed to determine a number of instances, or a number of discrete times of occurrence, of negative sentiment throughout the audio content.

The process flow 600 may proceed to block 618, at which a length of audio time may be determined. For example, computer-executable instructions stored on a memory of a device may be executed to determine a length of audio time of negative sentiment in the content. For example, a length of time of explosions or expletives occurring in the audio content may be determined. The length of audio time may be used to determine how much of an impact the negative sentiment may have on the overall content rating prediction.

If it is determined at determination block 610 that there is no negative sentiment present in the content, or after determining the length of audio time of negative sentiment at block 618, the process flow 600 may proceed to determination block 620. At determination block 620, computer-executable instructions stored on a memory of a device may be executed to determine whether violence is present in the audio content. For example, a remote server or a user device may be used to analyze one or more portions of audio of a content file to determine whether instances of violence are present. Violence may be determined to be present based at least in part on audio detection (e.g., gunshots, violence audio recognition model, etc.), pattern recognition, or other audio processing algorithms. In some embodiments, individual segments of audio data may be analyzed to determine whether violence is present. For example, the audio segment 612 corresponding to the video frame 614 may be determined to include an explosion following the expletive, and as a result, violence may be determined to be present in the audio content, and therefore, present in the content. It may therefore be determined that at least one violent feature is present in the audio content, and, correspondingly, in the video content. In some embodiments, video files or text files may also be used to determine violence features, such as explosion sound effects and the like.

If it is determined that violence is present at determination block 620, the process flow 600 may proceed to optional block 622, at which a number of instances of violence may be determined. For example, computer-executable instructions stored on a memory of a device may be executed to determine a number of instances, or a number of discrete times of occurrence, of violence throughout the content.

The process flow 600 may proceed to block 624, at which a length of presentation time may be determined. For example, computer-executable instructions stored on a memory of a device may be executed to determine a length of presentation time of violence or violent sounds in the content. For example, a first audio segment with violence may have a length of presentation time of 5 seconds, while a second scene with violence may have a length of presentation time of 10 seconds, for a length of presentation time of violence in the content totaling 15 seconds. The length of presentation time may be used to determine how much of an impact the violence may have on the overall content rating prediction.

If it is determined at determination block 620 that there is no violence present in the content, or after determining the length of presentation time of violence at block 624, the process flow 600 may proceed to determination block 626. At determination block 626, computer-executable instructions stored on a memory of a device may be executed to determine whether any predefined sounds appear or are otherwise present in the video content. For example, a remote server or a user device may be used to analyze one or more portions of audio of a content file to determine whether instances of any predefined sounds are present. Predefined sounds may be certain objects such as firearms, explosions, moans, and so forth. Sounds may be determined to be present based at least in part on audio detection, voice processing, or other audio, text, image, or video processing algorithms. In some embodiments, individual portions of audio data may be analyzed to determine whether any predefined sounds are present. In the example of FIG. 6, predefined sounds may be determined to be present at least in the audio segment 612, based at least in part on audio recognition of an explosion corresponding to the scene depicted in the video frame 614, and, correspondingly, present in the content.

If it is determined that any predefined sounds are present at determination block 626, the process flow 600 may proceed to optional block 630, at which a number of instances of predefined sounds may be determined. For example, computer-executable instructions stored on a memory of a device may be executed to determine a number of instances, or a number of discrete times of occurrence, of any predefined sounds throughout the content.

The process flow 600 may proceed to block 632, at which a length of presentation time may be determined. For example, computer-executable instructions stored on a memory of a device may be executed to determine a length of presentation time of any predefined sounds that appear in the content. For example, a first scene with a first predefined sound may have a length of presentation time of 40 seconds, while a second scene with a second predefined sound may have a length of presentation time of 10 seconds, for a length of presentation time of predefined sounds in the content totaling 50 seconds. The length of presentation time may be used to determine how much of an impact the predefined sounds may have on the overall content rating prediction.

If it is determined at determination block 626 that no predefined sounds are present in the content, or after determining the length of presentation time of predefined sounds at block 632, the process flow 500 may proceed to block 628, at which a set of features for the audio may be determined. For example, using some or each of the violence, negative sentiment, and/or predefined sounds detected or determined to be present in the content, a set of features may be determined. The set of features may be captured in a graph format, table format, or other format.

Figure 7:
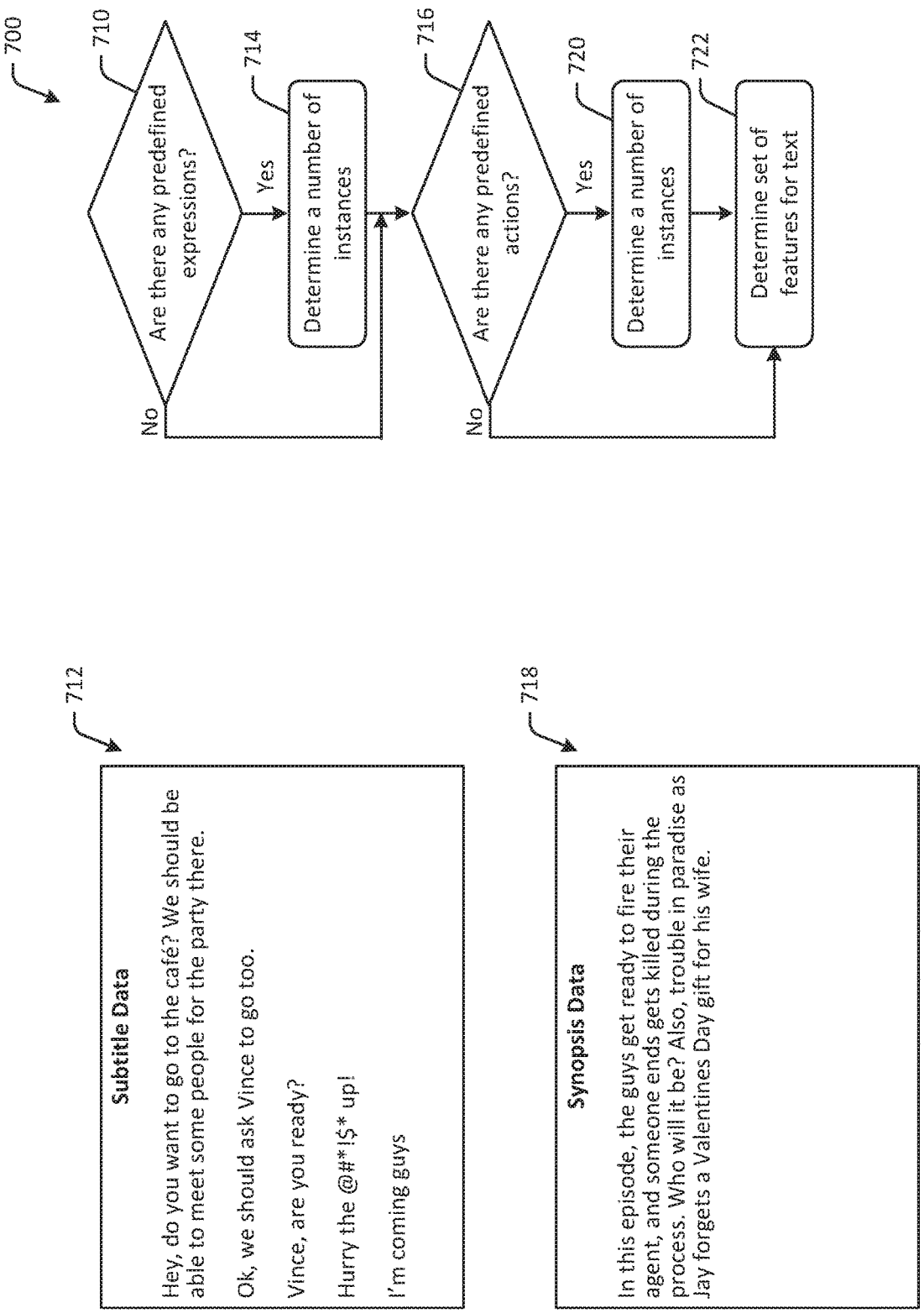
FIG. 7 is a schematic illustration of an example process flow for determining a set of features in textual content in accordance with one or more example embodiments of the disclosure.

FIG. 7 is a hybrid schematic illustration of example text content and an example process flow 700 for determining a set of features in textual content in accordance with one or more example embodiments of the disclosure. While example embodiments of the disclosure may be described in the context of subtitles, it should be appreciated that the disclosure is more broadly applicable to any suitable portion of text content or related metadata, such as summaries or synopses content. Some or all of the blocks of the process flows in this disclosure may be optional and may be performed in a distributed manner across any number of devices. The operations of the process flow 700 may be performed in a different order. The process flow 700 may be executed to determine features related to sex, violence, drugs, certain words or phrases, and other features.

At determination block 710 of the process flow 700, computer-executable instructions stored on a memory of a device may be executed to determine whether any predefined expressions appear or are otherwise present in text content. For example, a remote server or a user device may be used to analyze one or more portions of text of a content file to determine whether instances of predefined expressions are present. Predefined expressions may be certain expressions such as words or phrases, meanings, and so forth. Expressions may be determined to be present based at least in part on word identification (e.g., inappropriate word recognition model, etc.), natural language processing, semantic role labeling, or other text, image, or video processing algorithms. In some embodiments, individual portions of text data may be analyzed to determine whether any predefined expressions are present. In the example of FIG. 7, predefined expressions may be determined to be present at least in a first portion of subtitle data 712, based at least in part on the presence of expletives, and, correspondingly, present in the text content.

If it is determined that any predefined expressions are present at determination block 710, the process flow 700 may proceed to block 714, at which a number of instances of predefined expressions may be determined. For example, computer-executable instructions stored on a memory of a device may be executed to determine a number of instances, or a number of discrete times of occurrence, of any predefined expressions throughout the content.

If it is determined at determination block 710 that no predefined expressions are present in the content, or after determining the number of instances of predefined expressions at block 714, the process flow 700 may proceed to determination block 716. At determination block 716, computer-executable instructions stored on a memory of a device may be executed to determine whether any predefined actions appear or are otherwise present in text content. For example, a remote server or a user device may be used to analyze one or more portions of text of a content file to determine whether instances of predefined actions are present. Predefined actions may be certain actions or types of actions, such as killings, violence, sex, and so forth. Actions may be determined to be present based at least in part on word identification, natural language processing, semantic role labeling, or other text, image, or video processing algorithms. In some embodiments, individual portions of text data may be analyzed to determine whether any predefined actions are present. In the example of FIG. 7, predefined actions may be determined to be present at least in a second portion of synopsis data 718, based at least in part on the presence of a killing or someone dying, and, correspondingly, present in the text content.

If it is determined that any predefined actions are present at determination block 716, the process flow 700 may proceed to block 720, at which a number of instances of predefined actions may be determined. For example, computer-executable instructions stored on a memory of a device may be executed to determine a number of instances, or a number of discrete times of occurrence, of any predefined actions throughout the content.

If it is determined at determination block 716 that no predefined actions are present in the content, or after determining the number of instances of predefined actions at block 720, the process flow 700 may proceed to block 722, at which a set of features for the text may be determined. For example, using some or each of the predefined expressions and/or predefined actions detected or determined to be present in the content, a set of features may be determined. The set of features may be captured in a graph format, table format, or other format.

One or more of the process flows of FIGS. 5, 6, and 7 may be used to determine the presence of various features in content. For example, features detected during analysis of video content, such as gunfire, may be confirmed during analysis of text or audio data. One or more process flows or forms of analysis may be applied to various audio, text, or video components of content to determine or extract the presence of various features.

Figure 8:
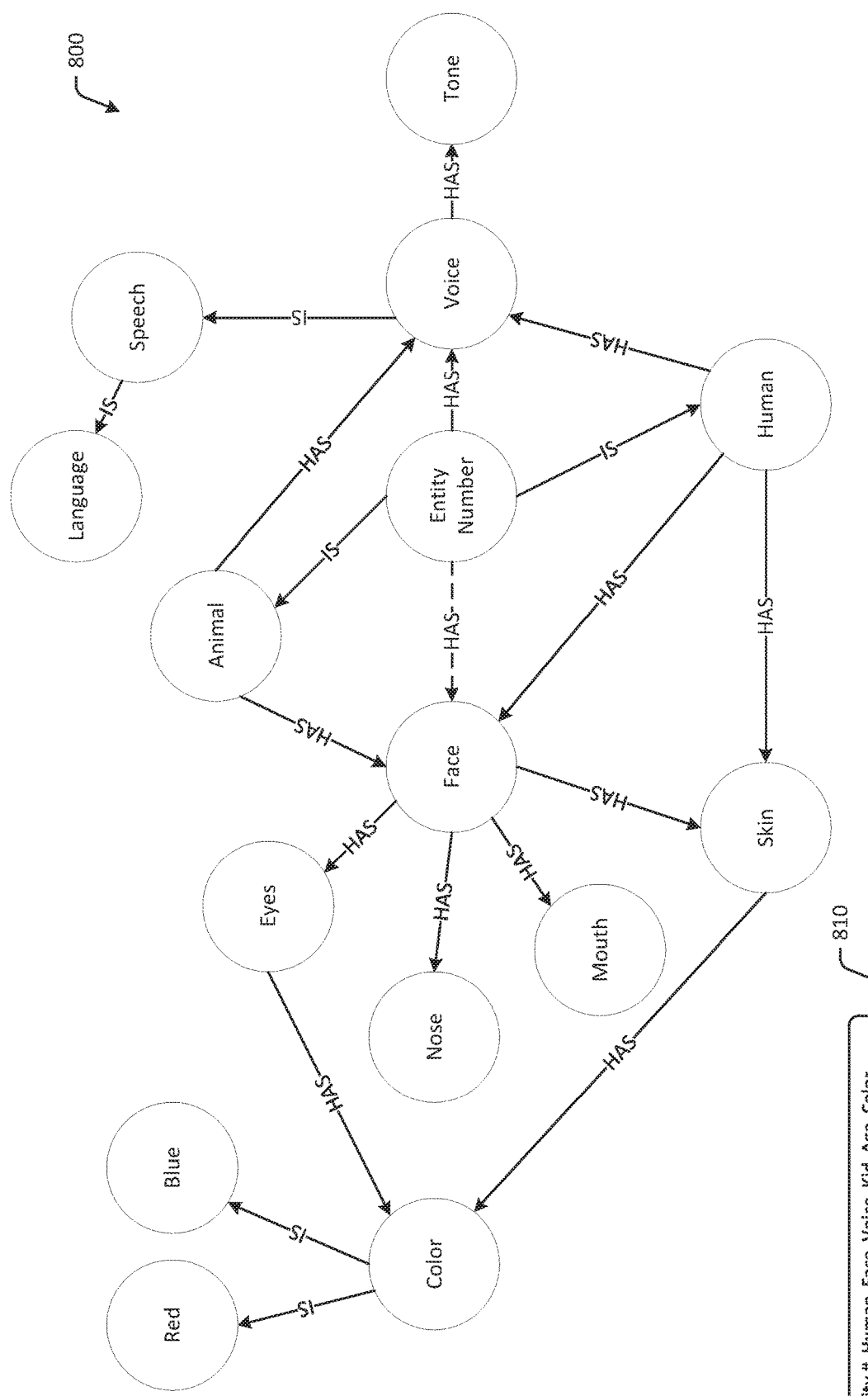
FIG. 8 is a schematic illustration of an example graph and feature table in accordance with one or more example embodiments of the disclosure.

FIG. 8 is a schematic illustration of an example graph 800 and feature table 810 in accordance with one or more example embodiments of the disclosure. The example graph 800 may represent features extracted from various components of content. For example, an entity number or a title of a character or content may be coupled to a type of character that defines the character as a human or an animal, either of which may have a face with eyes, a nose, a mouth, skin, and so forth. Components such as eyes and skin may have corresponding colors that may be defined by the feature graph 800. The feature graph 800 may further capture voices, along with a tone of the voice and indications of the speech using the voice and the associated language. In this manner, the representations may be visually discernible and may visually represent the features present in content.

The feature graph 800 may be flattened or converted into the feature table 810. The feature table 810 may represent the graph data in two-dimensional format. For example, the feature table 810 may indicate the number of human or animal faces in a particular scene, along with additional extracted data, such as estimated ages of humans, scenery locations, colors that appear, and so forth. Either or both the graph 800 or feature table 810 may be used to generate content ratings predictions.

Figure 9:
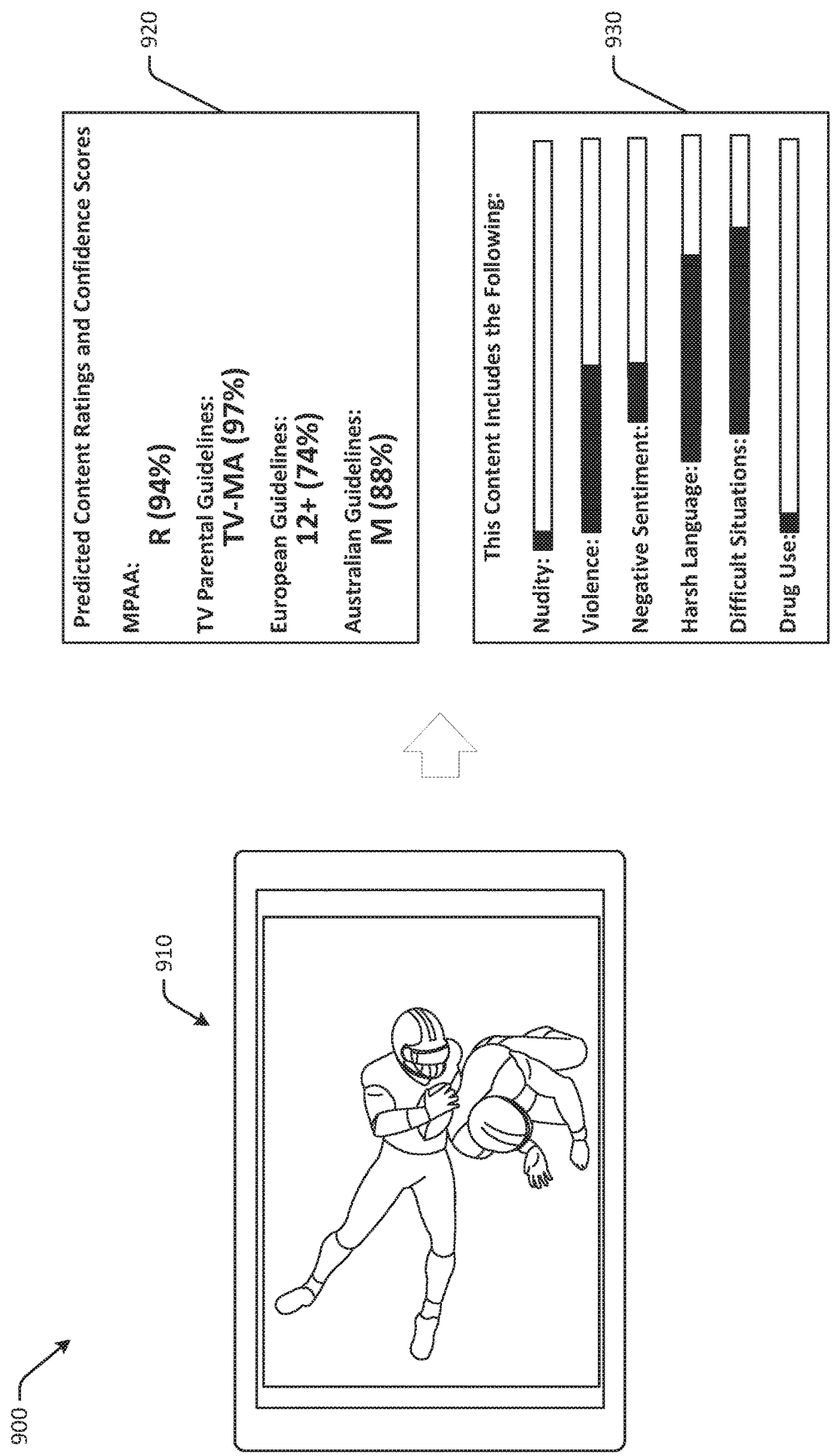
FIG. 9 is a schematic illustration of example user interfaces of content ratings data output in accordance with one or more example embodiments of the disclosure.

FIG. 9 is a schematic illustration of example user interfaces 900 of content ratings data output in accordance with one or more example embodiments of the disclosure. As illustrated in FIG. 9, predicted content ratings may be generated for content or certain portions (e.g., clips, segments, etc.) of content.

For example, content may include a football scene, as illustrated at a first user interface 910. The football scene may be part of a sports related movie or television program. Based at least in part on features extracted from one or more frames of the content, audio of the content, and/or text associated with the content, one or more predicted content ratings may be determined.

For example, at a second user interface 920, one or more predicted content ratings and corresponding confidence scores may be determined by embodiments of the disclosure. In the example of FIG. 9, predicted content ratings of: R for an MPAA rating entity may be determined with a 94% confidence score, TV-MA for an American television rating entity may be determined with a 97% confidence score, 12+ for a European (e.g., country, city, organization, etc.) rating entity may be determined with a 74% confidence score, M for an Australian rating entity may be determined with an 88% confidence score, and so forth. Accordingly, in some embodiments, more than one content rating may be predicted, such as content ratings for different ratings entities. Predicted content ratings may be indicative of a likely rating classification for the movie or other digital content in a particular entity, such as a particular country.

In some embodiments, a category heat map may be generated, such as that illustrated at a third user interface 930. The category heat map may be indicative of the presence of certain features in the content. The category heat map may be presented to users at display devices. The category heat map may, for example, include indications of a level or amount of nudity, violence, negative sentiment, harsh language or adult language, difficult situations or themes, drug use, and/or other features detect in the content. The graphical indications of the category heat map may be relative to other features in the content, relative to similar content, relative to the content as a whole, or so forth. For example, the level of nudity may be represented with a smaller bar for partial nudity or brief nudity, or a relatively larger bar for full nudity and/or more lengthy nude scenes or instances of nude scenes. In the example of FIG. 9, the category heat map may indicate that there is more violence than nudity, which may mean that violence impacted the content rating more than the nudity, negative sentiment, or drug use.

In some instances, the category heat map may be generated by determining level ratings for various features. For example, a nudity level rating may be determined for content using a corresponding feature table or graph, and the nudity level rating may indicate a level and/or length of nudity in the content. In another example, a violence level rating may be determined for the content using a corresponding graph or feature table, and the violence level rating may indicate a level and length of violence in the content. In another example, a negative sentiment level rating may be determined for the content using a corresponding graph or feature table, and the negative sentiment level rating may indicate a level and length of negative sentiment in the content. The respective ratings may be used to generate the category heat map and may be published along with the predicted content ratings, and, optionally, the confidence scores.

One or more operations of the methods, process flows, or use cases of FIGS. 1-9 may have been described above as being performed by a user device, or more specifically, by one or more program module(s), applications, or the like executing on a device. It should be appreciated, however, that any of the operations of the methods, process flows, or use cases of FIGS. 1-9 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-9 may be described in the context of the illustrative devices, it should be appreciated that such operations may be implemented in connection with numerous other device configurations.

The operations described and depicted in the illustrative methods, process flows, and use cases of FIGS. 1-9 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-9 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 10:
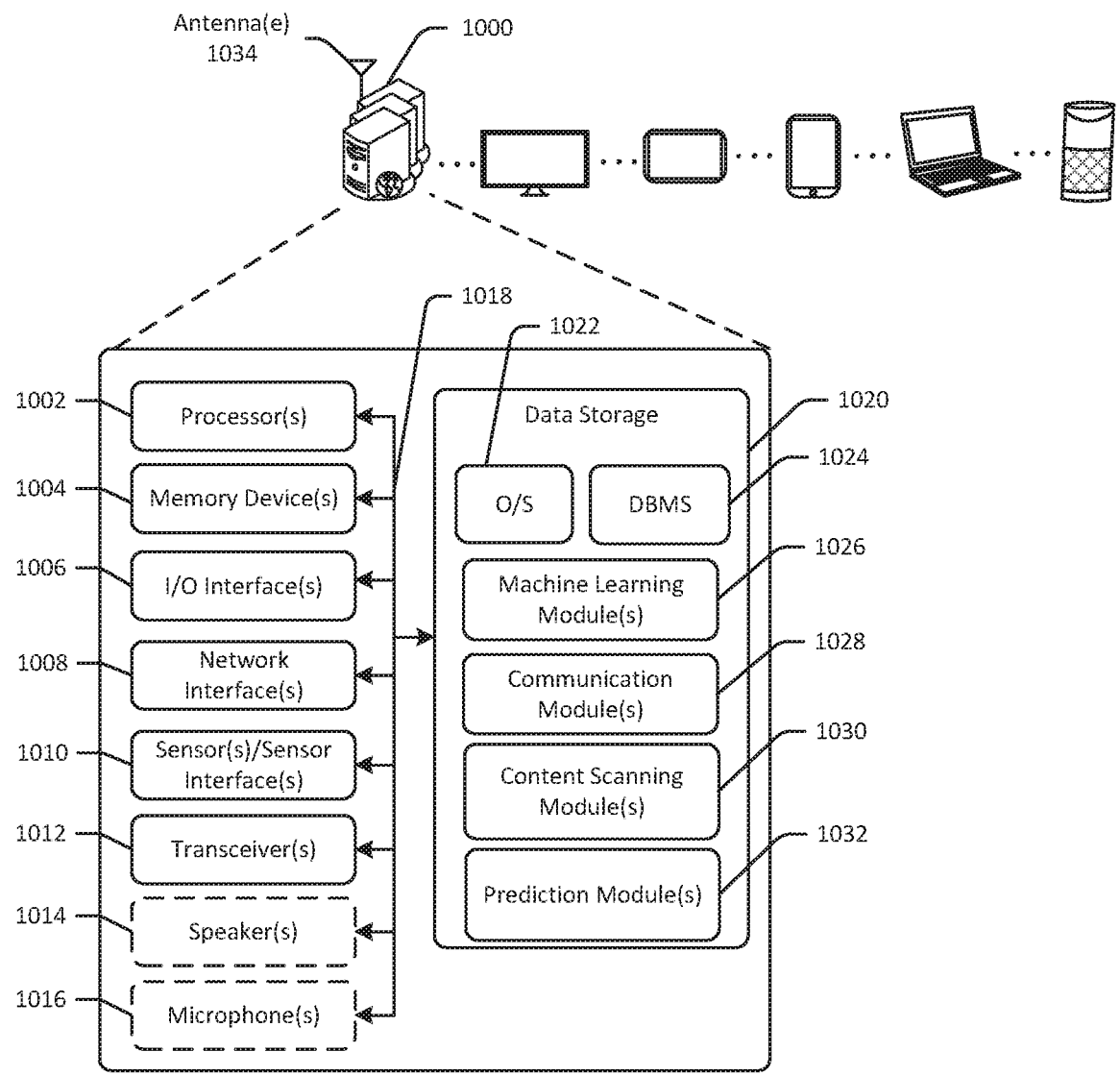
FIG. 10 is a schematic block diagram of an illustrative device in accordance with one or more example embodiments of the disclosure.

FIG. 10 is a schematic block diagram of an illustrative remote server 1000 in accordance with one or more example embodiments of the disclosure. The remote server 1000 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The remote server 1000 may correspond to an illustrative device configuration for the devices of FIGS. 1-9.

The remote server 1000 may be configured to communicate via one or more networks with one or more servers, search engines, user devices, or the like. In some embodiments, a single remote server or single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 1000 may include one or more processors (processor(s)) 1002, one or more memory devices 1004 (generically referred to herein as memory 1004), one or more input/output (I/O) interface(s) 1006, one or more network interface(s) 1008, one or more sensors or sensor interface(s) 1010, one or more transceivers 1012, one or more optional speakers 1014, one or more optional microphones 1016, and data storage 1020. The remote server 1000 may further include one or more buses 1018 that functionally couple various components of the remote server 1000. The remote server 1000 may further include one or more antenna(e) 1034 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1018 may include at least one of a system bus, a memory bus, an address bus, or a message bus, and may permit exchange of information (e.g., data (including computer-executable code), signaling, etc.) between various components of the remote server 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1004 of the remote server 1000 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to memory 1004 for use by the processor(s) 1002 during the execution of the computer-executable instructions. Moreover, output data generated as a result of execution of the computer-executable instructions by the processor(s) 1002 may be stored initially in memory 1004, and may ultimately be copied to data storage 1020 for non-volatile storage.

More specifically, the data storage 1020 may store one or more operating systems (O/S) 1022; one or more database management systems (DBMS) 1024; and one or more program module(s), applications, engines, computer-executable code, scripts, or the like such as, for example, one or more machine learning module(s) 1026, one or more communication module(s) 1028, one or more content scanning module(s) 1030, and/or one or more prediction module(s) 1032. Some or all of these module(s) may be sub-module(s). Any of the components depicted as being stored in data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in data storage 1020 may support functionality described in reference to correspondingly named components earlier in this disclosure.

The data storage 1020 may further store various types of data utilized by components of the remote server 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 1024 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 10, the datastore(s)

may include, for example, purchase history information, user action information, user profile information, a database linking search queries and user actions, and other information.

The processor(s) 1002 may be configured to access the memory 1004 and execute computer-executable instructions loaded therein. For example, the processor(s) 1002 may be configured to execute computer-executable instructions of the various program module(s), applications, engines, or the like of the remote server 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to functionality supported by the various program module(s) depicted in FIG. 10, the machine learning module(s) 1026 may include computer-executable instructions, code, or the like that responsive to execution by one or more of the processor(s) 1002 may perform functions including, but not limited to, determining training data sets, determining model accuracy, generating one or more machine learning models or algorithms, determining content ratings, determining frames of content, and the like.

The communication module(s) 1028 may include computer-executable instructions, code, or the like that responsive to execution by one or more of the processor(s) 1002 may perform functions including, but not limited to, communicating with one or more devices, for example, via wired or wireless communication, communicating with remote servers, communicating with remote datastores, sending or receiving notifications or search queries/content rating results, communicating with cache memory data, and the like.

The content scanning module(s) 1030 may include computer-executable instructions, code, or the like that responsive to execution by one or more of the processor(s) 1002 may perform functions including, but not limited to, analyzing digital content, extracting frames, determining pixel color values determining audio content, determining or analyzing text or audio files, identifying certain portions of content, and the like.

The prediction module(s) 1032 may include computer-executable instructions, code, or the like that responsive to execution by one or more of the processor(s) 1002 may perform functions including, but not limited to, predicting content ratings, generating user interface representations of content ratings, determining content rating values, and the like.

Referring now to other illustrative components depicted as being stored in the data storage 1020, the O/S 1022 may be loaded from the data storage 1020 into the memory 1004 and may provide an interface between other application software executing on the remote server 1000 and hardware resources of the remote server 1000. More specifically, the 0/S 1022 may include a set of computer-executable instructions for managing hardware resources of the remote server 1000 and for providing common services to other application programs (e.g., managing memory allocation among various application programs). In certain example embodiments, the 0/S 1022 may control execution of the other program module(s) to dynamically enhance characters for content rendering. The O/S 1022 may include any operating system now known or which may be developed in the future including, but not limited to, any server operating system, any mainframe operating system, or any other proprietary or non-proprietary operating system.

The DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 1000 is a mobile device, the DBMS 1024 may be any suitable light-weight DBMS optimized for performance on a mobile device.

Referring now to other illustrative components of the remote server 1000, the input/output (I/O) interface(s) 1006 may facilitate the receipt of input information by the remote server 1000 from one or more I/O devices as well as the output of information from the remote server 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), FireWire, Thunderbolt, Ethernet port or other connection protocol that may connect to one or more networks. The I/O interface(s) 1006 may also include a connection to one or more of the antenna(e) 1034 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 1000 may further include one or more network interface(s) 1008 via which the remote server 1000 may communicate with any of a variety of other systems, platforms, networks, devices, and so forth. The network interface(s) 1008 may enable communication, for example, with one or more wireless routers, one or more host servers, one or more web servers, and the like via one or more of networks.

The antenna(e) 1034 may include any suitable type of antenna depending, for example, on the communications protocols used to transmit or receive signals via the antenna (e) 1034. Non-limiting examples of suitable antennas may include directional antennas, non-directional antennas, dipole antennas, folded dipole antennas, patch antennas, multiple-input multiple-output (MIMO) antennas, or the like. The antenna(e) 1034 may be communicatively coupled to one or more transceivers 1012 or radio components to which or from which signals may be transmitted or received.

As previously described, the antenna(e) 1034 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1034 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1034 may be configured to transmit or receive radio frequency signals within any suitable frequency range forming part of the unlicensed portion of the radio spectrum.

The antenna(e) 1034 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1012 may include any suitable radio component(s) for—in cooperation with the antenna(e) 1034—transmitting or receiving radio frequency (RF) signals in the bandwidth and/or channels corresponding to the communications protocols utilized by the remote server 1000 to communicate with other devices. The transceiver(s) 1012 may include hardware, software, and/or firmware for modulating, transmitting, or receiving—potentially in cooperation with any of antenna(e) 1034—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1012 may further include hardware, firmware, or software for receiving GNSS signals. The transceiver(s) 1012 may include any known receiver and baseband suitable for communicating via the communications protocols utilized by the remote server 1000. The transceiver(s) 1012 may further include a low noise amplifier (LNA), additional signal amplifiers, an analog-to-digital (A/D) converter, one or more buffers, a digital baseband, or the like.

The sensor(s)/sensor interface(s) 1010 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 1014 may be any device configured to generate audible sound. The optional microphone(s) 1016 may be any device configured to receive analog sound input or voice data.

It should be appreciated that the program module(s), applications, computer-executable instructions, code, or the like depicted in FIG. 10 as being stored in the data storage 1020 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 1000, and/or hosted on other computing device(s) accessible via one or more networks, may be provided to support functionality provided by the program module(s), applications, or computer-executable code depicted in FIG. 10 and/or additional or alternate functionality. Further, functionality may be modularized differently such that processing described as being supported collectively by the collection of program module(s) depicted in FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 may be implemented, at least partially, in hardware and/or firmware across any number of devices.

It should further be appreciated that the remote server 1000 may include alternate and/or additional hardware, software, or firmware components beyond those described or depicted without departing from the scope of the disclosure. More particularly, it should be appreciated that software, firmware, or hardware components depicted as forming part of the remote server 1000 are merely illustrative and that some components may not be present or additional components may be provided in various embodiments. While various illustrative program module(s) have been depicted and described as software module(s) stored in data storage 1020, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s)

of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:
1. A method comprising:
    determining, by one or more computer processors coupled to memory, presence of a first feature in a first frame of a video;
    determining presence of a second feature in an audio file associated with the video;
    determining presence of a third feature in a text file associated with the video;
    generating a predicted content rating for the video using a machine learning model, wherein the predicted content rating is based at least in part on respective lengths of time associated with the first feature, the second feature, and the third feature;

determining a confidence score for the predicted content rating based at least in part on presence and associated length of time of one or more of the first feature, the second feature, or the third feature in a set of training data for the machine learning model;
determining that the confidence score satisfies a publishing threshold for a particular content rating; and
causing the predicted content rating to be published.

2. The method of claim 1, further comprising:
determining a frequency of mature content in the video;
wherein generating the predicted content rating for the video comprises generating the predicted content rating for the video based at least in part on the first feature, the second feature, the third feature, and the frequency of mature content.

3. The method of claim 1, further comprising:
using feedback data for the predicted content rating to retrain the machine learning model.

4. The method of claim 1, wherein generating the predicted content rating for the video comprises selecting a first predicted content rating for the video from a first set of content ratings for a first entity using the machine learning model.

5. The method of claim 4, further comprising:
selecting a second predicted content rating for the video from a second set of content ratings for a second entity using the machine learning model.

6. The method of claim 1, wherein generating the predicted content rating for the video comprises generating a first predicted content rating for video content of the video using the machine learning model, the method further comprising:
generating a second predicted content rating for audio content of the video using the machine learning model, wherein the second predicted content rating is based at least in part on the second feature.

7. A method comprising:
determining, by one or more computer processors coupled to memory, presence of a first feature in a first frame of a video;
determining presence of a second feature in an audio file associated with the video;
determining presence of a third feature in a text file associated with the video;
generating a first predicted content rating for video content of the video using a machine learning model, wherein the first predicted content rating is based at least in part on a first length of time associated with the first feature;
generating a second predicted content rating for audio content of the video using the machine learning model, wherein the second predicted content rating is based at least in part on a second length of time associated with the second feature;
determining that a first confidence score for the first predicted content rating is greater than a second confidence score for the second predicted content rating; and
causing the first predicted content rating to be published.

8. The method of claim 7, further comprising:
determining a frequency of mature content in the video;
wherein generating the first predicted content rating for the video comprises generating the predicted content rating for the video based at least in part on the first feature and the frequency of mature content.

9. The method of claim 7, further comprising:
determining that the first confidence score for the first predicted content rating satisfies a publishing threshold.

10. The method of claim 9, wherein determining that the first confidence score satisfies the publishing threshold comprises determining that the first confidence score satisfies the publishing threshold for a particular content rating.

11. The method of claim 7, further comprising:
using feedback data for the predicted content rating to retrain the machine learning model.

12. The method of claim 7, wherein generating the first predicted content rating for the video comprises selecting a first predicted content rating for the video from a first set of content ratings for a first entity using the machine learning model.

13. The method of claim 12, further comprising:
selecting a second predicted content rating for the video from a second set of content ratings for a second entity using the machine learning model.

14. A method comprising:
determining, by one or more computer processors coupled to memory, presence of a first feature in a first frame of a video;
determining presence of a second feature in an audio file associated with the video;
determining presence of a third feature in a text file associated with the video;
generating a predicted content rating for the video using a machine learning model, wherein the predicted content rating is based at least in part on respective lengths of time associated with the first feature, the second feature, and the third feature;
generating a category heat map having graphical representations indicative of the presence and associated length of time of the first feature, the second feature, and the third feature; and
causing presentation of the category heat map.

15. The method of claim 14, further comprising:
determining a frequency of mature content in the video;
wherein generating the predicted content rating for the video comprises generating the predicted content rating for the video based at least in part on the first feature, the second feature, the third feature, and the frequency of mature content.

16. The method of claim 14, wherein generating the predicted content rating for the video comprises selecting a first predicted content rating for the video from a first set of content ratings for a first entity using the machine learning model.

17. The method of claim 16, further comprising:
selecting a second predicted content rating for the video from a second set of content ratings for a second entity using the machine learning model.

18. The method of claim 14, further comprising:
using feedback data for the predicted content rating to retrain the machine learning model.

* * * * *